United States Patent [19]

Deckler

[11] 4,285,268

[45] Aug. 25, 1981

[54] AUTOMATIC SEQUENCING VALVE AND SYSTEM

[75] Inventor: Harry C. Deckler, South Bend, Ind.

[73] Assignee: White Farm Equipment Company, Oak Brook, Ill.

[21] Appl. No.: 861,705

[22] Filed: Dec. 19, 1977

Related U.S. Application Data

[63] Continuation-in-part of Ser. No. 651,443, Jan. 22, 1976, Pat. No. 4,067,394.

[51] Int. Cl.³ .............................................. F15B 11/00
[52] U.S. Cl. ........................................ 91/517; 91/191; 91/318; 91/518; 137/119; 172/2
[58] Field of Search ................ 91/514, 517, 518, 515, 91/171, 189 R, 191, 318; 137/113, 118, 119

[56] References Cited

U.S. PATENT DOCUMENTS

| 2,460,774 | 2/1949 | Trautman | 91/515 |
| 2,643,664 | 6/1953 | Willett | 91/515 |
| 2,985,184 | 5/1961 | Bowers | 91/514 |
| 3,481,489 | 12/1969 | Stauffer | 91/515 |
| 3,490,338 | 1/1970 | Faust | 91/517 |
| 3,631,879 | 1/1972 | Larson | 137/119 |
| 3,967,534 | 7/1976 | Cryder | 91/517 |

FOREIGN PATENT DOCUMENTS

| 215831 | 5/1958 | Australia | 91/514 |
| 44-19060 | 8/1969 | Japan | 91/189 |

Primary Examiner—Abraham Hershkovitz

[57] ABSTRACT

An automatic, hydraulically actuated, sequencing valve for use with a pair of hydraulic actuators (e.g. double acting hydraulic cylinders). The valve includes a valve body, a bore therein, and a valve spool axially shiftable in the bore. The valve spool shifts automatically due to creation of a differential in hydraulic pressures on opposite ends of the valve spool during each admission of hydraulic fluid under actuating pressure to the valve.

5 Claims, 10 Drawing Figures

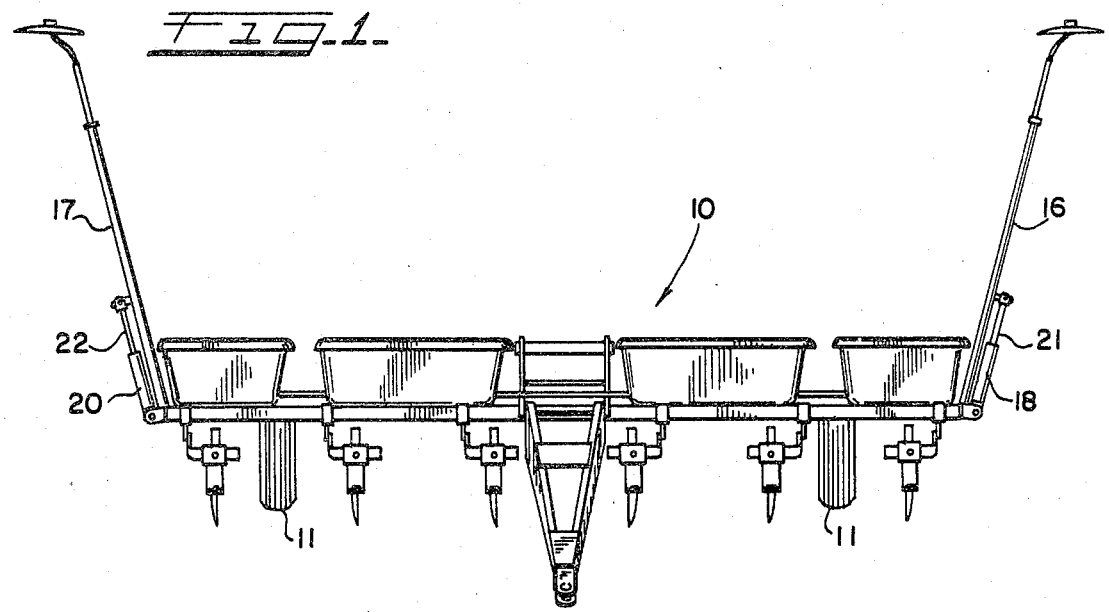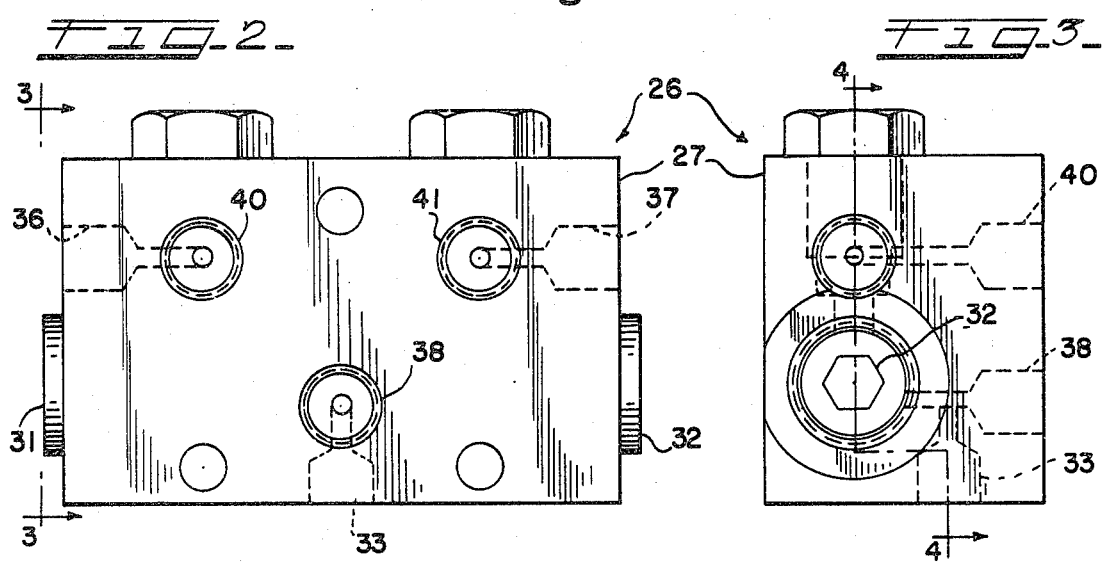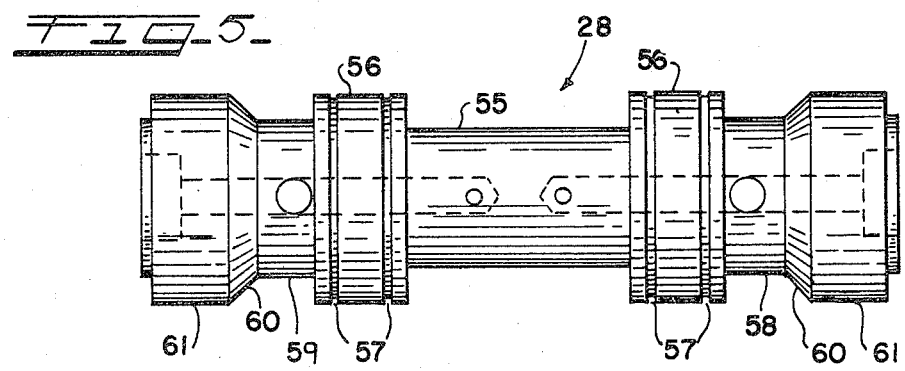

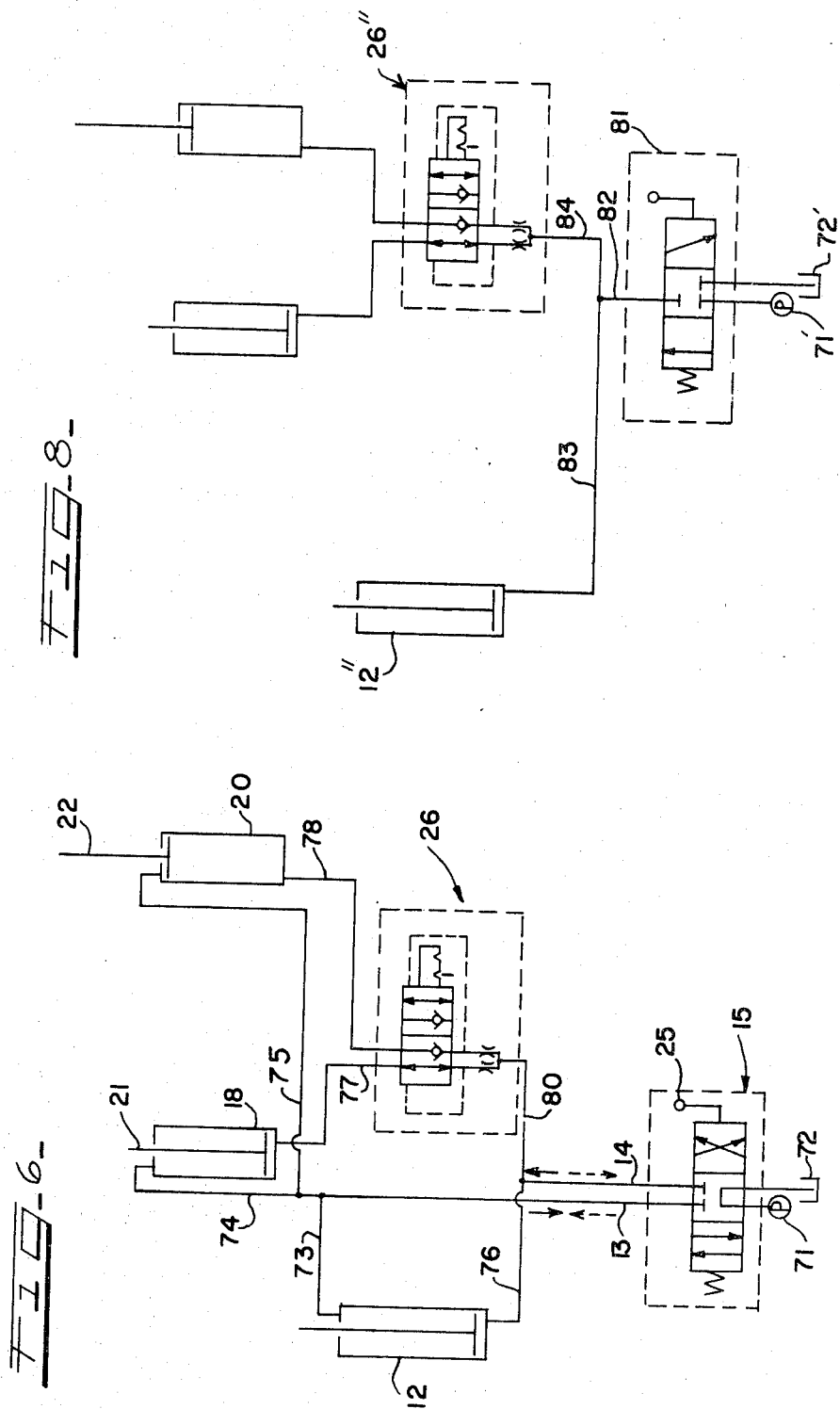

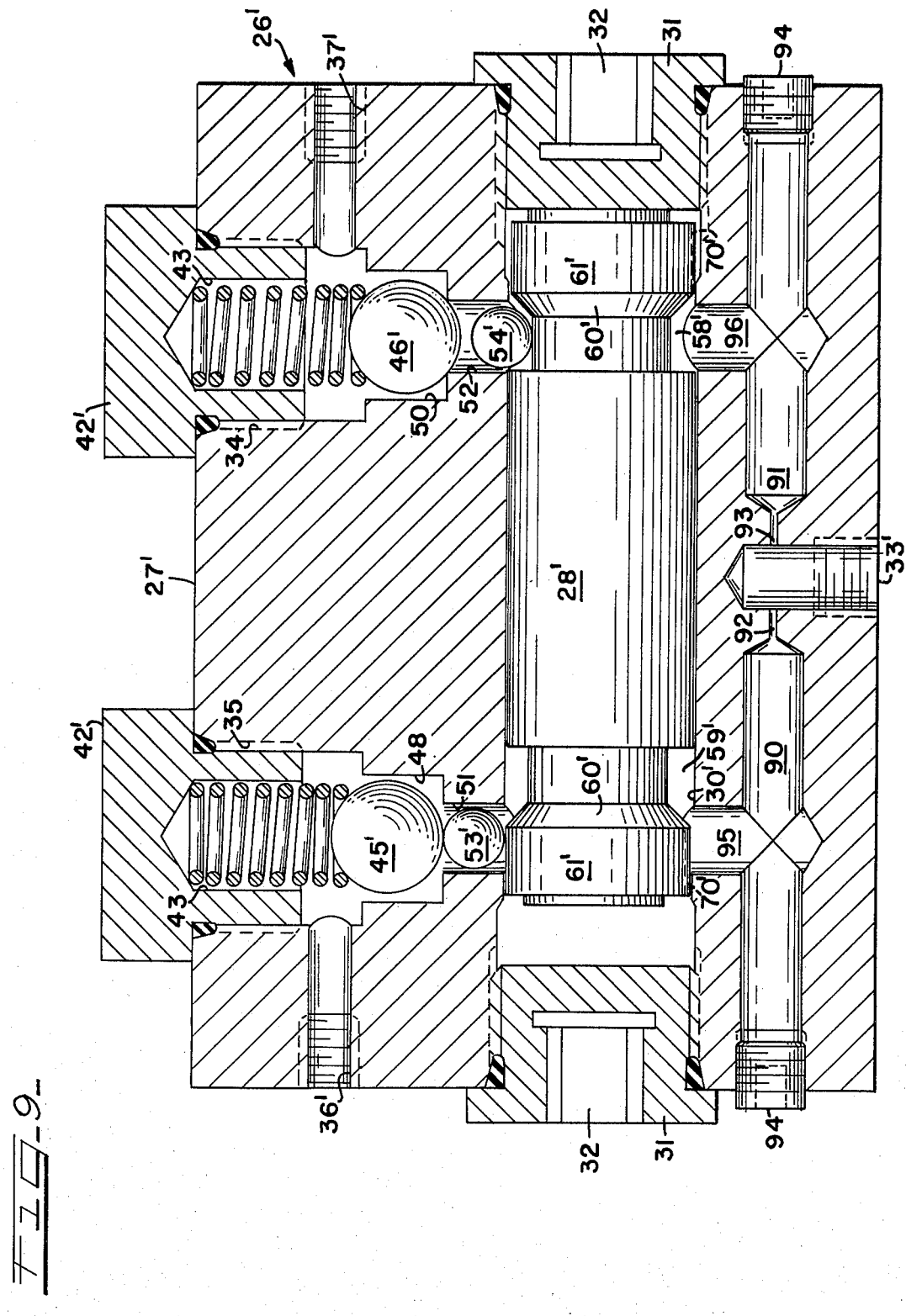

AUTOMATIC SEQUENCING VALVE AND SYSTEM

This application is a continuation in part of my prior copending application Ser. No. 651,443 filed Jan. 22, 1976, now U.S. Pat. No. 4,067,394 dated Jan. 10, 1978.

In my prior copending application, innovations and improvements in hydraulic valve systems for automatically operating the row markers of multi-row farm implements, e.g., multi-row planters, were described. As a part of the hydraulic valve systems described in my copending application, a novel automatic, hydraulically actuated valve was shown and described. The present invention is directed to the automatic hydraulically actuated sequencing spool valve of my prior copending application, including a two embodiments thereof not previously specifically disclosed, and system utilizing the same.

An important object of the invention is the provision of a new and improved automatic, hydraulically actuated, sequencing valve and system capable of being advantageously used in performing various operations including the automatic actuation of a pair of hydraulic cylinders. In one specific system, the hydraulic cylinders are mounted on a multi-row seed planter and serve to alternately raise and lower the row markers hinged to opposite sides of each planter.

A further object of the invention is the provision of an automatic, hydraulically actuated, sequencing valve and system in which a spool valve shifts in a bore each time hydraulic fluid is delivered to the valve under actuating pressure. Certain other objects of the invention will be obvious and will appear hereinafter.

For a more complete understanding of the nature and scope of the invention reference may now be had to the following detailed description thereof taken in connection with the accompanying drawings wherein:

FIG. 1 is a front elevation of a multi-row planter of the type adapted to be drawn by a tractor and having a row marker control and actuating system forming one embodiment of the present invention;

FIG. 2 is a side elevational view of an automatic marker sequencing valve constructed and operable in accordance with the present invention;

FIG. 3 is an end elevational view of the automatic sequence valve taken on line 3—3 of FIG. 2;

FIG. 5 is an elevational view on enlarged scale of the spool for the valve of FIGS. 2-4;

FIG. 6 is a hydraulic circuit diagram of the hydraulic system for raising and lowering the multi-row planter and alternately raising and lowering the markers shown in FIGS. 1-5;

FIG. 8 is a hydraulic circuit diagram of a system forming another modification of the hydraulic system shown in FIG. 6;

Figure 4:
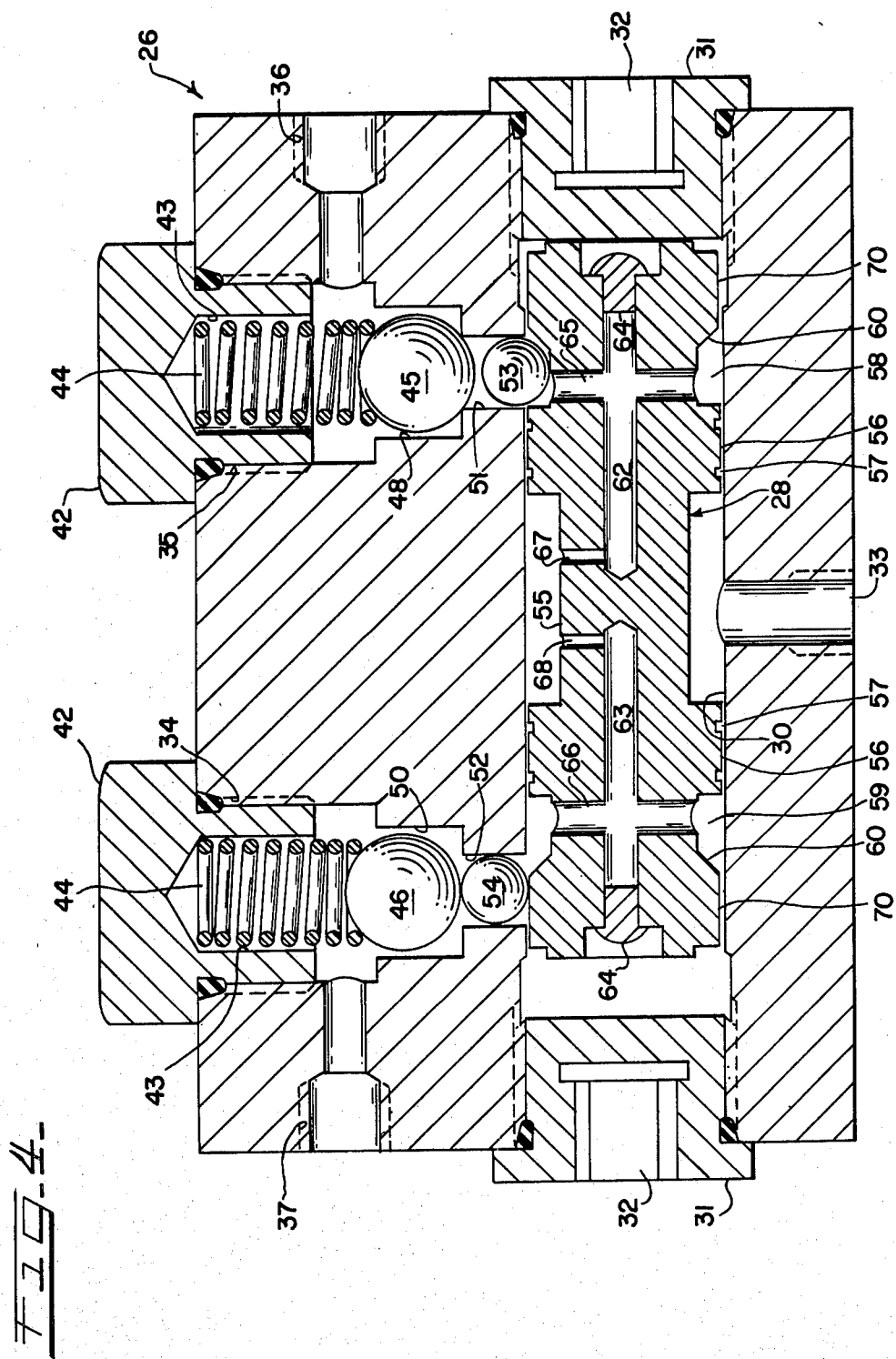
FIG. 4 is a vertical sectional view on enlarged scale taken on line 4—4 of FIG. 3.
Figure 10:
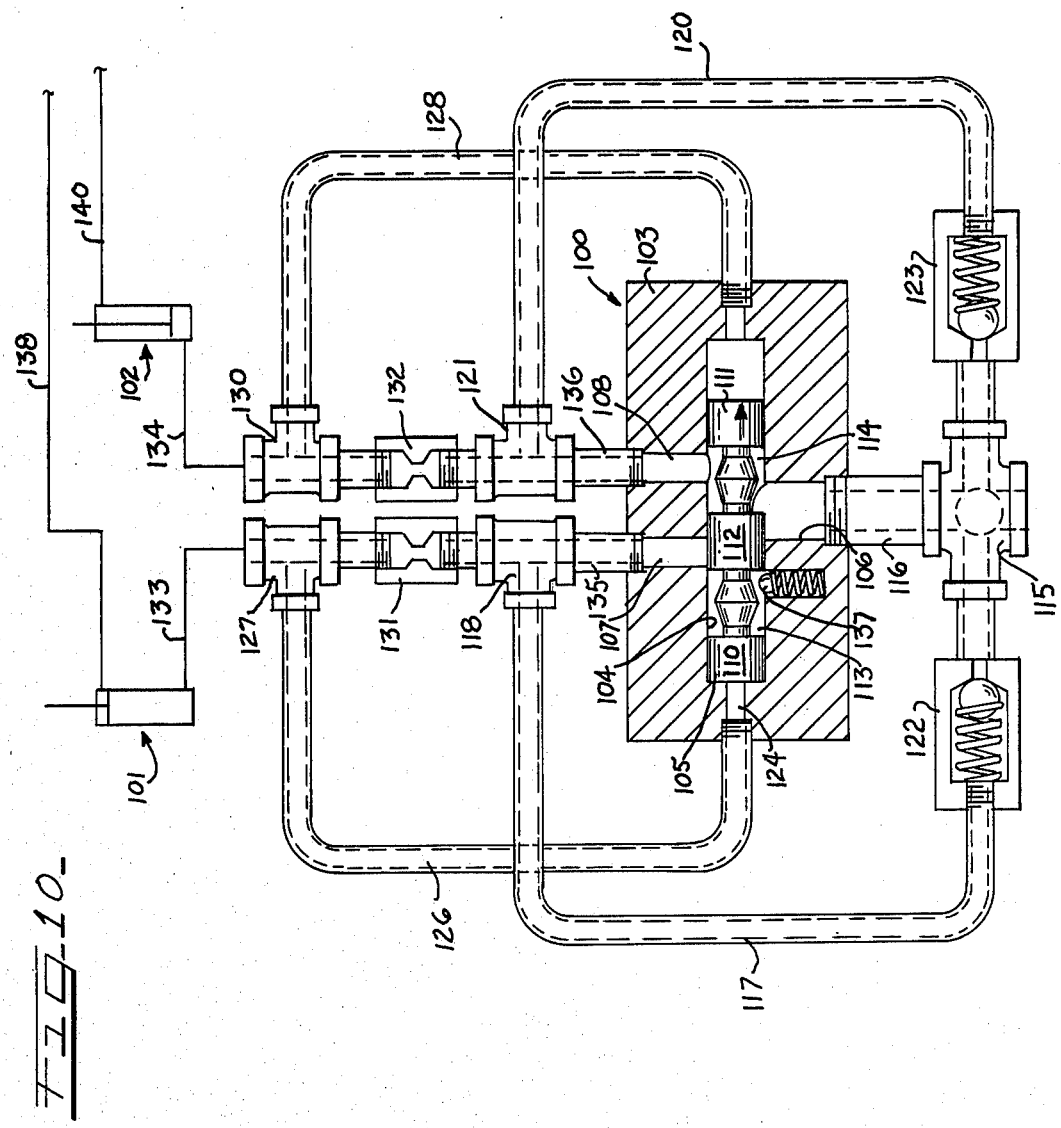

FIG. 9 is a vertical sectional view corresponding to FIG. 4 of an automatic hydraulically actuated sequencing spool vlave forming a second embodiment of the invention; and FIG. 10 is a partly sectional and partly diagrammatic view of an automatic hydraulic sequencing valve system for alternately activating each of two hydraulic actuators in accordance with the present invention and composed of commercially available components.

Referring to FIG. 1, a multi-row planter of known type is indicated generally at 10. The planter 10 is supported on a plurality of ground wheels 11 which are arranged to be raised and lowered in synchronism in known manner by means of a double-acting hydraulic cylinder 12 (FIG. 6). The cylinder 12 is connected by hydraulic pressure hoses or lines 13 and 14 to an open-center, four-way, three-position valve 15 (FIG. 6) of the type conventionally used on modern agricultural tractors. However, either open-center or closed-center control valves can be used with either single or double-acting installations.

A pair of left and right hand row markers 16 and 17, respectively, are hingedly or pivotally mounted on opposite sides of the planter 10. The row markers 16 and 17 are arranged to be actuated (i.e. alternately raised and lowered) by means of a pair of double-acting hydraulic cylinders 18 and 20, respectively, mounted in suitable manner on the multi-row planter 10 and having the distal ends of their piston rods 21 and 22, respectively, pivotally connected to the markers as shown.

As will be readily understood by those familiar with the operation of tractor-drawn or mounted implements such as the multi-row planter 10, in traversing a field while planting the ground wheels 11 are at least partially retracted so as to lower the planter into a planting condition and at the same time one of the markers 16 or 17 will be lowered so that the disc carried on the outboard end thereof will make a suitable mark in the earth on the unplanted side of the strip being planted. When the operator reaches the end of a traverse, which normally occurs on arriving at one of the boundaries of the field, he actuates the handle 25 (FIG. 6) on the tractor valve 15 so as to extend the planter lift cylinder 12 and also the wheels 11 thereby raising the planter out of planting engagement with the soil. The marker actuating system, as will be described below, is such that when the wheels 11 are extended (i.e. lowered) and the implement 10 thereupon raised, then marker that is down will also be raised. The operator then proceeds to make a 180° turn and then operates the handle 25 so as to allow the wheels 11 to retract (i.e. raise) thereby lowering the planter into planting engagement. On lowering the planter 10 the marker 16 or 17 that remained raised during the last previous traverse will now be lowered while the marker that has been raised last will remain raised. This sequence of operations continues as the operator proceeds to make a series of traverses of the field.

Reference may now be had particularly to FIGS. 2-5 for a description of the construction of the automatically actuable marker sequence valve 26 which constitutes a key component in the automatic marker actuating control system of the invention. The valve 26 comprises a valve body 27 which may be machined or cast from a suitable material, usually metal, and has housed therein a valve spool 28 formed of metal or other suitable material. The valve spool 28 is axially shiftable within a bore 30 (FIG. 4) extending end-to-end through the valve body 27 with the opposite ends of the bore 30 being tapped for receiving the threaded ends of the closure plugs 31—31 having socket wrench receiving recesses 32—32.

The valve block 27 is also suitably drilled and tapped to provide additional ports and interconnecting passages, including a bottom port 33, a pair of counterbored top ports 34 and 35, and a pair of counterbored end ports 36 and 37. In order to be able to make available connections to the valve body 27 from one face thereof instead of from the bottom and opposite ends, additional counterbored ports 38, 40 and 41 are provided (FIGS. 2 and 3) which communicate respectively with the ports 33, 36 and 37. It will be understood that when any of the ports 33, 36, 37, 38, 40 or 41 is not being utilized, the same will be closed by inserting thereinto a threaded plug.

Referring to FIG. 4, each of the counterbored top vertical ports 34 and 35 is tapped or threaded at the upper end so as to recive threaded plugs 42—42 each of which is provided with an axial socket or recess 43 opening to the bottom or inner end thereof for receiving and retaining therein the upper portion of a compression spring 44. The bottom end of each compression spring 44 bears against the upper portion of a check valve ball 45 or 46 retained within the intermediate counterbore sections 48 and 50, respectively. The bottom end of each counterbore section 51 and 52, respectively, opens into the horizontal passageway or opening 30 that receives the valve spool 28. The junctures between the smaller counterbore sections 51 and 52 and the intermediate counterbore sections 48 and 50, respectively, provide valve seats for the balls 45 and 46. A pair of smaller balls 53 and 54 are disposed in the passageways 51 and 52, respectively, for actuating or lifting the balls 45 and 46 upon the axial shifting of the spool 28 as will be described below. The smaller balls also serve as detents as will be mentioned below.

Referring to FIGS. 4 and 5 it will be noted that the valve spool 28 is symmetrical so that it does not make any difference as to which way it is inserted into the passageway 30. As its center portion the spool 28 is provided with a circumferential relatively wide groove 55 on the opposite sides of which are lands 56—56 each of which is provided with a pair of spaced circumferential balancing grooves 57—57. Outboard from the lands 56 are located circumferential grooves 58–59 the inner sides of which are vertical and the outer sides 60—60 of which are inclined or frusto-conical so as to provide camming surfaces for actuating the balls 53 and 54. Outboard of the grooves 58 are end lands or sections 61—61 of the spool 28. A pair of axial passageways 62 and 63 (FIG. 4) are drilled into the spool 28 from opposite ends. These passageways are counterbored at their outer ends so as to receive the heads of end plugs 64—64. Diametric passageways 65 and 66 are drilled in the spool 28 so as to intersect the axial passageways 62 and 63, respectively, and communicate with grooves 58 and 59, respectively. Relatively small diameter radial ports or passageways 67 and 68 are drilled into the spool 28 so as to communicate between the inner ends of the axial passageways 62 and 63, respectively, and the central circumference groove 55. The passageways 67, 68 are sized so as to throttle or restrict the flow rate of hydraulic fluid therethrough and thereby control the speed of actuation of the cylinders 18-20. The passageways 67, 68 by restricting the flow of fluid also determine the pressure differential between the ends of the valve spool 28, which causes it to shift axially in its bore 30 during the raising cycle of each marker.

The outer surface of each of the end lands 61 is provided with a small longitudinal groove 70 (FIG. 4) so as to provide a restrictive orifice in these lands permitting hydraulic fluid trapped in the adjacent end of the spool passageway 30 to exit in a controlled manner so that the axial movement of the spool 28 is slowed or restricted thereby preventing transient or momentary pressure surges from causing the valve spool 28 to shift prematurely. If desired, the end plugs 64—64 could be drilled with small openings to act as orifices in place of the grooves 70. However, the grooves 70 will have less tendency to become, or remain, plugged with foreign material and are therefore preferred.

Reference may now be had to FIGS. 4 and 6 for a description of the manner in which the valve 26 operates as a key component of the automatic marker control system on the implement 10. The tractor valve 15 has a port which is permanently connected with a pump indicated at 71 and another that is connected with a reservoir for hydraulic fluid indicated at 72. In addition, the tractor valve 15 has two ports with which the hydraulic lines 13 and 14 are connected which extend back to the implement 10. The valve 15 has three positions: a neutral position which is the position in which it is shown in FIG. 6; an implement-lowering position; and an implement-raising position. The lowering position is diagrammatically indicated at the left and when the valve 15 is shifted into the lowering position, (toward the right as viewed in FIG. 6) it will be seen that pressure flows from the pump 71 through the valve and out through the line 13 while fluid returns through line 14 and valve 15 into the sump 72. Alternately, it will be seen that when the valve 15 is shifted to the left into its raising position, then pressure from the pump 71 is communicated to the port that is connected with line 14 while the port to which line 13 is connected is placed in communication with the reservoir 72. The solid arrows adjacent the lines 13 and 14 in FIG. 6 indicate the flow of fluid through lines 13 and 14 during raising while the broken arrows indicate the directions of flow during lowering.

The hydraulic line 13 has connected thereto distributor lines 73, 74 and 75 which are connected to the planter lift cylinder 12, the left marker actuating cylinder 18, and the right marker actuating cylinder 20, respectively. The lines 73, 74 and 75 are connected to appropriate end ports on the cylinders 12, 18 and 20, respectively, so that when fluid under pressure is flowing through the lines or connections they serve to retract the pistons therein. The port at the opposite end of the cylinder 12 is connected by line 76 to the hydraulic line 14. The port at the opposite end of the cylinder 18 is connected by line 77 to port 37 of the valve 26 while the port at the opposite end of the cylinder 20 is connected by line 78 to the port 36 of the valve 26. The bottom port 33 of the valve 26 (and when desired the alternate side port 38) is connected by a line 80 to the hydraulic line 14.

With the tractor valve 15 in the neutral position (its normal condition during traversing) it will be understood that there will be no flow of hydraulic fluid through either the tractor valve 15, the marker sequencing valve 26, or through any of the hydraulic lines or cylinders of the system. Since the ball check 45 is held in the seated condition as shown in FIG. 4 by both the force of spring 44 and the force or pressure due to the weight of the raised right hand marker 17 acting on the extended piston and in turn on the liquid in the cylinder 20, no flow past the ball check 45 is permitted and the right hand marker remains in the raised position.

When the tractor pulling the planter 10 reaches the end of the row or traverse, the operator will manipulate the handle 25 of the valve 15 so as to place the valve in its implement-raising position whereupon fluid under pressure discharges from the valve 15 through the line 14 from which it is distributed through the line 76 to the planter lift cylinder 12 and through the line 80 to the marker sequencing valve 26. The flowing hydraulic fluid serves to extend the piston and piston rod of the cylinder 12 so as to raise the planter 10 with fluid being discharged from the opposite side of the piston through line 73 and line 13 and through the valve 15 into the sump or reservoir 72. At the same time the fluid under pressure enters either the port 33 or 38 of the valve 26 (depending upon which is connected to line 80) the fluid flows through the restricted passageway 68, into the axial passageway 63, thence into the diametric passageway 66, upwardly past the balls 54 and 46, and out through the port 37 and line 77 to the left marker actuating cylinder 18. No fluid flow occurs through passageways 67, 62 and 65 because the right cylinder 20 (FIG. 6) is already at the limit or end of its stroke. The fluid enters the cylinder 18 and acts against the retracted piston therein so as to extend the piston and piston rod and thereby raise the left marker 16. During this extending of the piston rod, the fluid on the opposite side of the piston discharges through the line 74 and into the line 13.

Since the fluid under pressure can flow only through the restricted passageway 68, then under a reduced pressure through 63-66-52-50 to cylinder 18, and cannot flow through the alternate passageway 67, there is a differential in the pressure acting on the opposite ends of the spool 28 with that acting on the right hand end being greater than that acting on the left hand end. This differential in pressure is sensed by passageways 67, 62, 65, 58 and 70 in which a very minute amount of fluid is free to flow and produces a shifting of the spool 27 from the right to the left. However, shifting will be resisted in part by small size of the vent grooves 70 in the spool lands 61 and in part by the detent action of the ball 53 seated in the groove 58. The shifting of the spool 28 in one direction or the other begins at the start of each raise cycle and continues with the shift being completed early in the cycle while the raising of the marker that was down is continuing. It will be seen that when the spool 28 shifts to the left, the actuating ball 53 will ride up the inclined or camming surface 60 onto the adjacent end land 61 and thereby causes the ball check 45 to be unseated. However, since the right hand marker actuating cylinder 20 is already extended, there will be no flow of fluid past the ball check 45 and through the line 78. With the shift of the spool 28 to the left being completed, the groove 59 will be in registration with the actuating ball 54 which is free to fall into this groove 59 thereby allowing the ball check 46 to be seated as soon as the actuating cylinder 18 is fully extended so that the left hand marker is fully raised and no further flow of fluid is permitted through the line 77.

When the operator has completed his turn with both of the markers now being in their raised position, he will actuate the operating handle 25 so as to place the tractor valve 15 in its implement-lowering position. Fluid under pressure will now flow through line 13 and in turn through the branch connections 73, 74 and 75. At the same time the line 14 is connected with the reservoir 72 through the valve 15 and thereby allows fluid to flow through and discharge through lines 76 and 80 into line 14 and then into reservoir. In this manner the implement planter cylinder 12 will be returned to its retracted or lowered position. Fluid will also be allowed to discharge from the right hand marker cylinder 20 through line 78 and past the unseated ball check 45 and then via passageways 65, 62 and 67 to the discharge port 33 or 37 thence through the lines 80 and 14 to the reservoir 72. Since the ball check 46 for the left hand marker cylinder will be in the seated condition, no fluid will be allowed to discharge past this ball check and the left hand marker will remain in the raised position. When the implement is fully lowered the operator places the operating handle 25 of the valve 15 in the neutral position and the system remains static during traverse of the field.

It will be understood that when the operator reaches the end of the traverse being made with the right hand marker down and the left hand marker raised, he will again manipulate the valve 15 so as to place it in the implement-raising condition. Thereupon the foregoing sequence of operations or cycle will reoccur but in the alternate order with the valve spool 28 being shifted to the right so that the right hand cylinder which is being raised will remain raised while the left hand marker will be allowed to lower when the operator next lowers the implement 10.

Figure 7:
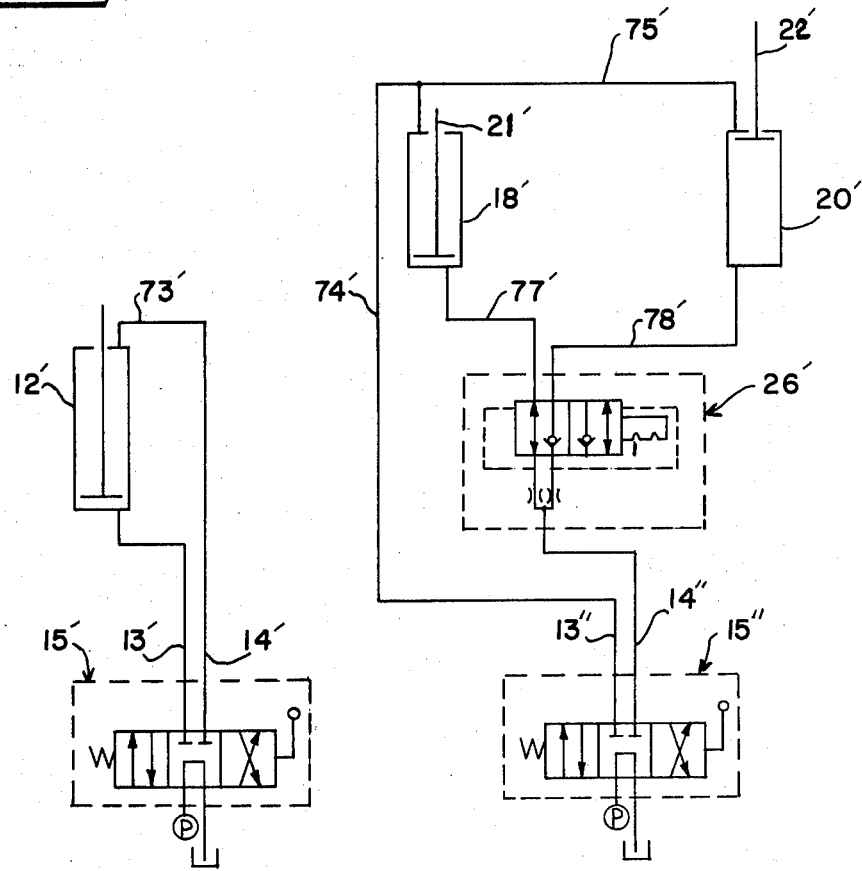
FIG. 7 is a hydraulic circuit constituting a modification of the hydraulic circuit shown in FIG. 6.

If it is desired to have a system wherein the implement can be operated, i.e. raised and lowered independently and the markers can likewise be operated independently, this can be accomplished by providing two valves on the tractor as indicated at 15′ and 15″ in FIG. 7. It will be seen from the diagram in FIG. 7 that the sequencing valve 26′ will operate in the same manner as previously to alternately raise and lower the left and right hand markers when the tractor valve 15″ is manipulated so as to place it alternately in marker-raising position and marker-lowering position while intermittently occupying the neutral condition. The system of FIG. 7 has the advantage of flexibility from the standpoint of the operator since he can raise, lower or leave raised one or both markers independently of the position or condition of the implement. For example, the operator may not want to lower either of the markers in the event there is not adequate clearance on either side or it is necessary for the markers to be raised in order to clear obstacles such as trees, ditches, etc. On the other hand, the system of FIG. 7 has the disadvantage or requiring the operator to manipulate two tractor valves 15′ and 15″ instead of a single valve.

FIG. 8 illustrates diagrammatically a system wherein the automatic marker sequencing valve 26″ is utilized with a planter lift cylinder and marker actuating cylinders of the single acting type. That is, hydraulic fluid for actuating these cylinders is introduced and discharged through the same port. The force of the hydraulic fluid is utilized for extending these cylinders and they depend upon the weight of the implement and markers respectively and/or spring action or other known spring-like energy storing means for retracting the cylinders during lowering. Referring to FIG. 8 it will be seen that the tractor valve 81 is of the type that in one position fluid is transmitted by the valve from a pump or pressure source 71′ through a line 82 which connects with a line 83 going to the planter lift cylinder 12″ and through line 84 to the sequencing valve 26″. When the valve 81 is in the implement lowering position, then line 82 is placed in communication with the sump or reservoir 72′. It will be seen that the sequencing valve 26″ operates in the same way as described above in connection with FIG. 6 to alternately raise and lower the left and right hand markers 16 and 17.

Referring to FIG. 9, the hydraulic sequencing valve indicated generally at 26' therein corresponds, and is similar in structure, to the automatic sequencing valve 26 shown and described in connection with FIGS. 1-8. Accordingly, corresponding parts and features are given the same reference numerals as in FIG. 4 but each corresponding reference numeral is primed.

The port 33' in the valve body 27' does not extend into the bore 30' in which the valve spool 28' is axially shiftable. The valve spool 28' is cylindrical and continuous from end to end except for circumferential grooves 58' and 59' adjacent opposite ends of the spool.

A pair of aligned bores 90 and 81 are drilled into the valve body 27' terminating at their inner ends where they join restricted passageways 92 and 93, respectively. The outer ends of the bores 90 and 91 are closed by screw plugs 94—94. A short vertical passageway 95 communicates between the bore 90 and the bore 30' that receives the valve spool 28'. Similarly, a vertical passageway 96 communicates between the bore 30' and the bore 91.

Functionally, the restricted passageways 92-93 correspond to the restricted passageways 67 and 68 in the valve spool 28 in the sequencing valve 26. It will be understood that the operation of the valve 26' corresponds to the operation of the valve 26 in all respects.

Referring to FIG. 10, the hydraulic sequencing valve system shown therein constitutes an embodiment of the invention formed primarily from standard commercially available components. A three-way, pilot-operated, spool valve of known commercial type is indicated generally at 100 which, in combination with the additional components, is used to alternately activate each of two hydraulic actuators 101 and 102 which can correspond to the double-acting hydraulic cylinders 18 and 20 in FIGS. 1 and 6 or to the single acting hydraulic cylinders shown in FIG. 8.

The spool valve 100 includes a valve body 103 in which there is a valve spool bore 104 to accommodate an axially shiftable valve spool 105. The valve body 103 includes a center valve port 106 communicating with the center portion of the bore 104 and a pair of spaced ports or passageways 107 and 108 on opposite sides of the center of the bore 104.

The valve spool 105 has bore-fitting lands 110 and 111 on opposite ends thereof and a bore-fitting center land 112. Circumferential reliefs in the form of circumferential grooves 113 and 114 are provided on the valve spool 105 inboard of the lands 110 and 111, respectively, and outboard of the end portions of the center land 112.

Exteriorly of the spool valve 100, suitable hydraulic connections are provided to interconnect the spool valve with the actuators 101 and 102. One of the components is a standard cross-fitting 115, the upper connection of which is connected with the center port 106 by means of a pipe nipple 116. The bottom connection of the fitting 115 is adapted to be connected to a suitable control valve (not shown) such as the open-center, four-way, three-position valve 15 (FIG. 6). The left-hand connection of the fitting 115 is connected by means of a conduit 117 to a pipe tee 118. The right-hand connection of the fitting 115 is connected by a conduit 120 to a pipe tee 121. Standard check valves 122 and 123 are disposed in lines or conduits 117 and 120, respectively, and oriented therein so as to permit hydraulic fluid under pressure to flow from the fitting 115 one way to the tee 118 and one way to the tee 121.

A passageway or port 124 is provided in the valve body 103 to communicate with the left end of the spool bore 104. Similarly, a passageway or port 125 is provided in the valve body communicating with the right-hand end of the bore 104. A conduit or line 126 interconnects the passageway or port 124 with a pipe tee 127 while a conduit or line 128 connects the passageway or port 125 with a tee 130. A coupling including a flow restrictor 131 of known type interconnects the upper connection of tee 118 with the lower connection of the tee 127. Likewise, a restrictor 132 interconnects the upper connection of tee 121 with the lower connection of tee 130. The upper connection or outlet of tee 127 is connected by a line or conduit 133 with one connection of the actuator 101 while the upper connection or outlet of tee 130 is connected by a line 134 to the actuator 102.

The lower connection of tee 118 is connected to the port or passageway 107 by a nipple 135 while the bottom connection of tee 121 is connected to the passageway or port 108 by a nipple 136.

Preferably a ball detent 137 is provided for retaining the valve spool 105 in either of its two alternate positions until positively shifted.

In operation with the system being in the condition shown in FIG. 10, when hydraulic fluid under pressure is admitted to the bottom connection of the fitting 115, it can only flow through the passageway or port 108 and/or the line 120. But not through the passageway 107 or line 117 since the piston in the actuator 101 is in its uppermost position preventing admission of additional hydraulic fluid. However, the piston in the actuator 102 can be extended or moved upwardly and thereby hydraulic fluid under pressure can flow through the port 106, circumferential groove 114, passageway 108 and coupling 136 to tee 121.

As a result of fluid flowing to the actuator 102 but not to the actuator 101, a differential is created in the hydraulic pressure acting on opposite ends of the spool 105 which differential is sufficient to axially shift the spool from its left-most position as shown in FIG. 10 to its right-most position. If the piston in actuator 102 has not already reached its uppermost position before the valve spool 105 shifts to the right, and the center land 112 shuts off communication to the passageway 108 whereupon hydraulic under pressure can continue to flow through the line 120 and and through the restrictor 132, tee 130 and line 134 to the actuator 102. The result is that the system will reach a condition wherein the pistons in both actuators 101 and 102 are in their uppermost positions and no additional hydraulic fluid under pressure is allowed to flow.

In the next operation, the control valve (not shown) is operated so as to permit hydraulic fluid under pressure to flow through line 138 to the upper end of the actuator 101. When this occurs, hydraulic fluid discharges through line 133, restrictor 131, coupling 135, passageway 107, circumferential groove 113, port or passageway 106, coupling 116 and fitting 115 to the control valve and reservoir. When the piston in the actuator 101 reaches its lowermost position, the system will be in condition for hydraulic fluid under pressure to again be introduced into the fitting 115. As will be understood, it will follow a flow pattern which drives the piston in actuator 101 to its uppermost position while at the same time shifting the valve spool 105 back to its left-most position as shown.

I claim:

1. An automatic hydraulically actuated sequencing spool valve comprising: a valve body having, a valve spool-receiving bore therein closed at opposite ends, a first port therein for alternately receiving hydraulic fluid under actuating pressure to actuate one of a pair of hydraulic actuators controlled by said valve and discharging hydraulic fluid from the other hydraulic actuator of said pair, a second port therein for providing hydraulic fluid communication between one of the said hydraulic actuators and said bore adjacent one end thereof, and a third port therein for providing hydraulic fluid communication between the other of said hydraulic actuators and said bore adjacent the opposite end thereof; and, a valve spool axially shiftable in said bore between either and only a first position wherein said spool engages a first end of said bore and is spaced from the second end and a second position wherein said spool engages said second end of said bore and is spaced from said first end, and having lands adjacent opposite ends and at least one land adjacent the middle with a circumferential groove separating each of said end lands from a said land at or adjacent the middle, and each of said circumferential grooves being in communication with the adjacent one of said second and third ports; first restricted passageways in said valve spool or said valve body communicating between said first port and each of said circumferential grooves, and second restricted passageways in each end of said valve spool or said bore adjacent said opposite ends thereof and providing restricted fluid flow communication between each of said circumferential grooves and the adjacent closed end of said bore, said first restricted passageways producing a differential in pressure acting through said second restricted passageways on opposite ends of said valve spool each time hydraulic fluid under actuating pressure is delivered to said first port to actuate one of said actuators while the other actuator is extended and stationary so as to shift said valve spool from whichever position it is in to its alternative position; check valve means for each of said second and third ports; and valve actuating means for each of said check valve means adapted to be alternately actuated to the open position by said valve spool on the axial shifting thereof.

2. An automatic hydraulically actuated sequencing spool valve for use in controlling fluid operated actuators comprising: a valve body having a valve spool-receiving bore therein; a valve spool axially shiftable between only two operable positions in said bore; and closure means sealing the opposite ends of said bore; said valve spool having a relatively wide circumferential central groove in the central portion thereof, bore-fitting intermediate lands at opposite sides of said central groove, a relatively narrow circumferential groove on the outboard side of each of said bore-fitting intermediate lands, bore-fitting lands on the opposte ends of said spool, a pair of first restricted fluid transmitting passageways within said spool communicating respectively between each of said relatively narrow circumferential grooves and said relatively wide circumferential groove, a second restricted passageway in each of said end lands providing communication between the adjacent one of said first fluid transmitting passageways and the adjacent end of said bore; said valve body having a central port communicating with said relatively wide circumferential groove, a pair of spaced ports providing communication respectively with said relatively narrow circumferential grooves, check valve means for each of said spaced ports, and valve actuating means for each of said check valves adapted to be alternately actuated to the open condition by said valve spool on the axial shifting thereof; said first restricted passageways allowing creation of pressure differentials acting on opposite ends of said valve spool to shift the same alternately between opposite ends of said bore on actuation of one actuator and also controlling the rate of operation of said actuators used in conjunction with said valve, and said second restricted passageways being sized to control the rate of shifting of said spool.

3. The automatically hydraulically actuated sequencing spool valve called for in claim 3 wherein each of said valve actuating means comprises a ball engageable in turn by the adjacent one of said bore-fitting end lands on said spool and by outboard side surface to the adjacent one of said relatively narrow circumferential grooves, said surface being generally frusto-conical.

4. An automatic hydraulically actuated sequencing spool valve for use in controlling a pair of fluid operated actuators, comprising: a valve body having a valve spool receiving bore therein; a valve spool axially shiftable between only two operable positions in said bore; and closure means sealing the opposite ends of said bore; said valve spool having a circumferential groove adjacent each end separating an end land on the adjacent end from the land in the central portion of said valve spool; a first port in said valve body for alternately receiving hydraulic fluid under actuating pressure to actuate one of said actuators and discharging hydraulic fluid from the other actuator; a second port in said valve body providing hydraulic fluid communication between one of said actuators and said bore adjacent one end thereof; a third port in said valve body providing hydraulic fluid communication between the other of said actuators and said bore adjacent the opposite end thereof; first restricted passageways in said valve body providing communication between said first port and the opposite ends of said bore at locations opening into said respective circumferential grooves; second restricted passageways in the ends of said valve spool and/or in the opposite ends of said bore providing restricted hydraulic fluid flow between said grooves and the respective adjacent ends of said bore; check valve means in each of said second and third ports; and check valve actuating means for each of said check valve adapted to be alternately actuated from closed to open condition by said valve spool on the axial shifting thereof; said second restricted passageways allowing creation of pressure differentials acting alternately on opposite ends of said spool to shift the same alternately between opposite ends of said bore and controlling the rate of shifting of said valve spool.

5. An automatic hydraulic sequencing valve system for alternately activating each of two hydraulic actuators through one retraction-extension cycle comprising, in combination, a spool valve comprising a valve body having a spool receiving bore and a valve spool axially shiftable therein between either and only a first position wherein said spool engages a first end of said bore and is spaced from the second end and a second position wherein said spool engages said second end and is spaced from said first end, said valve body having a first port for alternately receiving hydraulic fluid under pressure to actuate one of said hydraulic actuators and discharging hydraulic fluid from the hydraulic actuator, and a pair of spaced passageways in said valve body communicating with said bore on opposite sides of the center thereof, said valve spool having first and second bore-fitting lands adjacent opposite ends thereof, circumferential reliefs inboard of each of said end lands, and a bore-fitting land portion inboard of each of said circumferential reliefs, first conduit means providing hydraulic fluid communication between said first port and a control valve operable to alternately deliver hydraulic fluid under pressure and to discharge hydraulic fluid to reservoir, separate conduit means providing hydraulic fluid communication between each of said spaced passageways and a separate one of said actuators, means providing a fluid flow restriction in the flow path between said first port and each of said actuators, a check valve in the fluid flow path between each of said actuators and said first conduit means, and means providing hydraulic fluid communication between each end of said valve body bore and the fluid flow path between one of said actuators and said fluid flow restriction means associated therewith, upon each admission and resulting flow of hydraulic fluid under pressure to actuate one of said actuators while the other actuator is extended and stationary a differential in hydraulic pressure being created on opposite ends of said spool sufficient to axially shift the same to its alternate position in said bore, said pressure differential being due to fluid flow through one of said fluid flow restriction means and absence of fluid flow through the other fluid flow restriction means.

* * * * *

UNITED STATES PATENT AND TRADEMARK OFFICE
CERTIFICATE OF CORRECTION

PATENT NO. : 4,285,268
DATED : August 25, 1981
INVENTOR(S) : Harry C. Deckler

It is certified that error appears in the above—identified patent and that said Letters Patent is hereby corrected as shown below:

Column 7, line 13, "81" should read -- 91 --.
Column 10, line 13, "3" should read -- 2 --.

Signed and Sealed this

Fifteenth Day of December 1981

|SEAL|

Attest:

GERALD J. MOSSINGHOFF

Attesting Officer  Commissioner of Patents and Trademarks